United States Patent Office 3,155,577
Patented Nov. 3, 1964

3,155,577
TASTELESS DIOCTYLSULFOSUCCINATE COMPOSITION AND METHOD OF MAKING SAME
Neil H. Mercer and Hugh D. Bryan, Evansville, Ind., assignors to Mead Johnson & Company, Evansville, Ind., a corporation of Indiana
No Drawing. Filed May 8, 1962, Ser. No. 193,300
16 Claims. (Cl. 167—56)

The present invention concerns certain aluminum hydroxide dioctyl sulfosuccinate complexes, processes for the preparation thereof, and pharmaceutical compositions containing them.

The sodium salt of dioctyl sulfosuccinic acid is known to medicine as a gentle acting fecal hydrator or stool softener that conditions the stool for easier passage without laxative stimulation. The calcium salt has been employed in a similar fashion. These products have met with considerable success in the treatment of patients with painful anorectal conditions, and those taking medications such as certain iron compounds and aluminum hydroxide which tend to cause hard stools. These products are also of value to cardiac patients, infants and children, and patients with fecal impactions.

The preparation of elegant pharmaceutical formulations of sodium and calcium dioctyl sulfosuccinates is severely hindered by the extremely bitter taste of these salts. As a result, sodium and calcium dioctyl sulfosuccinates have been formulated chiefly as coated tablets and capsules. Both are therapeutically satisfactory but the manufacture of coated tablets is relatively expensive and has only been resorted to since many patients prefer a tablet to a capsule. Liquid forms including syrups for oral use have also been prepared but these have not been considered entirely satisfactory due to the taste problem. A tasteless yet efficacious form of dioctyl sulfosuccinic acid is, therefore, needed to permit the preparation of superior dosage forms thereof.

A further problem presented to the pharmacist in preparing satisfactory dosage forms of sodium dioctyl sulfosuccinate is the wax-like nature of the material. It is difficult to prepare tablets and generally to manipulate a plastic solid of this sort. Prior attempts to overcome difficulties arising from this characteristic of sodium dioctyl sulfosuccinate have included the preparation of granulations with such materials as sodium benzoate. Furthermore, prior forms have not lent themselves satisfactorily to the preparation of liquid dosage forms.

It is an object of the present invention, therefore, to provide a tasteless therapeutically effective form of dioctyl sulfosuccinic acid which is readily adapted for pharmaceutical formulation work. It is a further object to prepare superior tablet and liquid oral dosage forms thereof.

These and other objects of the present invention are accomplished by the formation of the novel aluminum hydroxide complexes of dioctyl sulfosuccinic acid described and claimed herein. These products are friable, crystal-like materials which are essentially tasteless, and, therefore, suitable for the preparation of elegant liquid dosage forms, simple tablets, and chewable tablets. The aluminum hydroxide complexes of the present invention are useful for the same therapeutic purposes as are the sodium and calcium salts of dioctyl sulfosuccinic acid. They are administered in similar dosages and by the same routes.

The present aluminum hydroxide dioctyl sulfosuccinate complexes as they are generically termed to take into account the fact that their structures are not known with certainty, are dry, friable, crystal-like solids, rather than wax-like, plastic materials as are prior pharmaceutical forms of dioctyl sulfosuccinic acid. Although they are somewhat hygroscopic, they are water insoluble. These substances are relatively tasteless, a great advantage from the point of view of preparing pharmaceutically elegant dosage compositions. Use of the term aluminum hydroxide complex in referring to the present substances is not intended to denote structure nor exclude the possibility that they are hydrated aluminum oxide complexes, as there is some controversy in the art as to the precise structural nature of aluminum hydroxide itself.

It has been found that when aluminum hydroxide is contacted in solution at pH 3.2 to 4.5 with dioctyl sulfosuccinic acid or a salt thereof in a molecular ratio of about 1:1 to 3:1 that an aluminum hydroxide dioctyl sulfosuccinate complex of the character claimed herein is formed. The reaction is carried out in a solvent in which the reactants have a reasonable solubility. By this is meant a solubility of about one mole per liter or greater. More dilute solutions, of course, can be used, but use of more dilute solutions adds to expense and inconvenience in large scale operation.

The aluminum hydroxide may be provided as such or when an aqueous solvent mixture is used any solvent soluble aluminum salt which hydrolyzes thereto under the reaction conditions may be substituted. Many salts of dioctyl sulfosuccinic acid are suitable, the criteria being solubility in the reaction solvent and compatibility of the cation with the other reactants. The sodium and calcium salts are the most readily available and are quite suitable. Other metal and amine salts meeting the above criteria may be employed.

A water containing solvent mixture is preferred. The preferred solvents are mixtures of the alkanols, polyols, or lower dialkyl ketones having up to about 4 carbon atoms with from about one-half to two volumes of water per volume of organic water miscible solvent. A mixture made up of equal volumes of water and ethanol is quite satisfactory. Acetone in combination with water has also been found to be satisfactory. Since the process is apparently a simple metathetical reaction between the ionic forms of the two reactants, a reaction medium comprised of at least about 25% water is preferred to promote ionization.

The composition of the product obtained is to a large extent dependent upon the proportion of reactants employed when operating with ionic solutions in the pH range specified. For instance, if equimolar amounts of aluminum and dioctyl sulfosuccinate are employed, a product is obtained in which, on a molar basis, the aluminum and sulfur occur in 1:1 atomic ratio. Use of higher proportions of aluminum in the reaction results in products having correspondingly higher proportions of aluminum combined therein. Pharmaceutically elegant products containing, on a molar basis, from about 1 to 3 atoms of aluminum per atom of sulfur may be prepared in this fashion. Broadly the compositions of this invention contain from about 4.5% to 13.7% aluminum, from 4.0 to 7.3% sulfur and up to about 20% water on a weight basis. In the preferred form these compositions contain from 4.5 to 7.8% aluminum, from 6.0 to 7.3% sulfur, and up to 10.5% water on a weight basis.

Operating with equimolar proportions of reactants, the product obtained contains on an anhydrous weight basis 5.6% aluminum and 6.6% sulfur. When operating with higher proportions of aluminum reactant, the aluminum content of the resulting product increases in direct proportion to the ratio of reactants charged to the reaction vessel. It is thought that the aluminum hydroxide is combined in the form of a coordination complex with the dioctyl sulfosuccinate. Batch-to-batch variations in weight percent of water contained in the product are sometimes observed. These variations, of course, effect the analytical values of the other components.

The compounds of the present invention are customarily administered by the oral route in doses ranging from 1.0 to 400 mg. per kg. of body weight. Various types of pharmaceutical dosage formulations may be employed including compressed tablets, chewable tablets, capsules, solutions, suspensions, etc. The formulation may contain a compound of the present invention as the sole active ingredient or other active ingredients may be included to provide complementary effects. Such other ingredients may include laxatives, bulking agents such as sodium or calcium alginate, methyl cellulose, carboxymethyl cellulose, psyllium gum, or sterculia gum, ion exchange resins, and other medications useful in assisting alimentary elimination.

Compositions in dosage unit form contain from 10 to 500 mg. of aluminum hydroxide dioctyl sulfosuccinate complex. These compositions are prepared by conventional pharmaceutical methods employing either solid or liquid carriers, excipients, and diluents along with suspending agents, stabilizers, flavors, preservatives, lubricants, etc., as needed. Examples of suitable carriers include corn starch, lactose, calcium sulfate, polyethylene glycol, water, sesame oil, peanut oil, propylene glycol, ethanol, etc.

The following examples are provided to illustrate in detail preparation of the aluminum hydroxide dioctyl sulfosuccinate salt complexes and pharmaceutical compositions thereof which constitute the present invention.

EXAMPLE 1

A 1.0 molar solution of sodium dioctyl sulfosuccinate is prepared by dissolving 1 kg. (2.25 moles) thereof in sufficient 1:1 aqueous ethanol, U.S.P. (49% ethanol volume basis), to provide 2250 ml. of solution. A solution of aluminum hydroxide is prepared by dissolving 651.8 g. (2.7 moles) of aluminum chloride hexahydrate, U.S.P., in sufficient water to provide 2250 ml. of solution. These two solutions are then fed into a mixing vessel at the same rate, and the pH of the resulting mixture is continuously adjusted and maintained within the range pH 3.2 to 4.5 and as near pH 4.0 as possible by adding 2.6 N aqueous sodium hydroxide thereto as required. The aluminum hydroxide dioctyl sulfosuccinate complex separates as a precipitate. It is collected by centrifugation, thoroughly washed with water and then with 1:1 aqueous ethanol. It is purified by dissolving in chloroform, filtering, and removing the chloroform from the filtrate by distillation, leaving the residue as a white, friable solid which has the following analysis: Al, 4.89%; S, 6.25%; $H_2O$, 8.69%. The product is essentially odorless and has only a slightly bitter taste. Animal tests have shown that this material is the physiological equivalent on a weight basis of sodium dioctyl sulfosuccinate and calcium bis (dioctyl sulfosuccinate) as a fecal hydrator.

EXAMPLE 2

The procedure of Example 1 is repeated employing various molar ratios of aluminum chloride to sodium dioctyl sulfosuccinate. Except for this change the preparations are run in the same fashion as Example 1. The results are arranged in Table II.

The composition, physical form or consistency, and taste of the products obtained when from 1 to 3 moles of aluminum chloride per mole of sodium dioctyl sulfosuccinate are employed are in accordance with the preceding discussion. The weight yield thereof increases with the amount of aluminum hydroxide supplied in accordance with the ability of the dioctyl sulfosuccinate to form homogeneous complexes with from 1 to 3 moles thereof.

The solubility of representative products of this invention in various solvents was determined by shaking carefully weighed samples thereof of various sizes with measured volumes of the solvents at room temperature. Filtration, drying, and weighing of the material which failed to dissolve permitted calculation of the concentration of the saturated solutions in the various solvents. The results obtained follow in Table I.

TABLE I.—SOLUBILITIES AT ROOM TEMPERATURE

Legend:
6. Very soluble _____ >30 g./100 ml.
5. Freely soluble _____ 10–30 g./100 ml.
4. Soluble _____ 3.3–10 g./100 ml.
3. Sparingly soluble _____ 1–3.3 g./100 ml.
2. Slightly soluble _____ 0.5–10 g./100 ml.
1. Essentially insoluble _____ <0.5 g./100 ml.

| Solvent | Test Sample | | |
|---|---|---|---|
| | 1 | 2 | 3 |
| Water | 1 | 1 | 1 |
| Ethyl alcohol, U.S.P. | 5 | 4 | 3 |
| Propylene Glycol | 2 | 1 | 1 |
| Chloroform | 6 | 6 | *6 |
| 1:1 Aqueous Ethanol | 3 | 1 | 1 |
| Benzene | 6 | 6 | (**) |

*Slight turbidity.
**Unfilterable gelatinous suspension.
1. Molar Al:S ratio 1:1. Analysis.—Al, 5.4%; S, 6.1%; $H_2O$, 10.2%.
2. Molar Al:S ratio 2:1. Analysis.—Al, 9.8%; S, 5.6%; $H_2O$, 7.3%.
3. Molar Al:S ratio 3:1. Analysis.—Al, 12.3%; S, 4.8S%; $H_2O$, 9.9%.

TABLE II.—VARIATION OF MOLAR PROPORTIONS (EXAMPLE 2)

| Molar Ratio, $AlCl_3 \cdot 6H_2O$/DSS[1] | Composition | | | Yield[2] (g.) | Form | Taste |
|---|---|---|---|---|---|---|
| | Al | S | $H_2O$ | | | |
| 2 | 8.0 | 5.72 | 9.36 | 211 | Dry, Friable | Very slightly bitter. |
| 1 | 5.5 | 6.15 | 4.49 | 187 | ___do___ | Somewhat bitter. |
| 3 | 12.4 | 4.72 | 8.91 | 239 | ___do___ | None. |
| 2 | 9.8 | 5.64 | 7.36 | 213 | ___do___ | Do. |
| 1.6 | 8.6 | 5.98 | 4.54 | 206 | ___do___ | Very slightly bitter. |
| 1.4 | 7.3 | 5.97 | 3.96 | 187 | Somewhat waxy, but still friable. | Slightly bitter. |
| 1.2 | 6.5 | 6.21 | 4.42 | 192 | Very slightly waxy, but essentially dry and friable. | Do. |

[1] Sodium dioctyl sulfosuccinate.
[2] From 200 g. of sodium dioctyl sulfosuccinate; dry basis.

The pH at which the process is carried out has quite a definite effect on the nature of the product obtained. Satisfactory product is obtained when operation is carried out within the range 3.2 to 4.5 with the preferred value being pH 4.0. Reaction at pH 3.0 and more acidic values favors hydrolysis of the ester functions of the dioctyl sulfosuccinate reactant. Octyl alcohol so released has a very characteristic odor and taste which is quite incompatible with pharmaceutical elegance.

At pH values of 5.0 and 6.0 a bitter tasting product is obtained, perhaps the result of partial neutralization of acidic aluminum hydroxide hydroxyl groups or incomplete reaction of sodium dioctyl sulfosuccinate when it is used as a reactant. At pH 6.0 the physical form is also adversely affected, a waxy solid being obtained rather than the dry, friable crystal-like material desired.

Water alone is not a satisfactory vehicle for reaction of sodium or calcium dioctyl sulfosuccinates due to their low solubilities therein. The aqueous alkanols, dialkyl ketones, and polyols having up to about four carbon atoms such as ethanol, isopropanol, acetone, butanol, methyl ethyl ketone, glycerol, and low molecular weight polyethylene glycols give generally satisfactory results. Aqueous acetone as solvent is illustrated by the following.

EXAMPLE 3

Sodium dioctyl sulfosuccinate, 1.4 kg., is dissolved in sufficient 1:1 acetone-water to provide 3.65 l. of solution. Aluminum chloride hexahydrate, 0.912 kg., and sodium hydroxide pellets, 0.333 kg., are separately dissolved in sufficient water to provide 3.65 l. of solution of each. The three solutions were then simultaneously fed at equal rates by volume to a reaction flask containing 1.65 l. of 1:1 acetone-water. Precipitation of the product begins almost immediately. The entire volume is stirred during the mixing process, which requires 45 min. The pH of the final suspension is about 4.5. The product is collected, washed with water which is first adjusted to pH 4.0 (dilute HCl), and then with 1:3 acetone-water adjusted to pH 4 (dilute HCl). The product after drying in a circulating air oven weighs 1.52 kg. and is found on analysis to be comprised of 5.73% aluminum, 6.68% sulfur, and 4.6% water. This material is almost tasteless and has a dry, friable, crystal-like nature which is well suited for the preparation of formulations of the type described herein.

Bases other than aqueous sodium hydroxide may be employed in the process for pH adjustment. The aqueous alkali metal hydroxides such as sodium and potassium hydroxide are preferred. Water soluble nitrogen bases such as ammonia and triethanolamine, methylamine, and ethanolamine are also operable.

Aluminum hydroxide itself and water soluble salts of aluminum are satisfactory sources of aluminum hydroxide for the process. When using an aluminum salt, it is preferred, that a pharmaceutically acceptable anion be associated therewith to reduce the care required in its removal after reaction of the aluminum salt with the dioctyl sulfosuccinate. Examples of this follow.

EXAMPLES 4 AND 5

Hydrated aluminum sulfates ($Al_2(SO_4)_3 \cdot 18H_2O$) and hydrated aluminum nitrate ($Al(NO_3)_3 \cdot 9H_2O$) are substituted on a molecular proportional basis for aluminum chloride in the procedure of Example 1 using 200 g. of sodium dioctyl sulfosuccinate and proportionate amounts of the aluminum salts. The results of these experiments are arranged in Table III.

TABLE III.—OTHER ALUMINUM SALTS AS ALUMINUM HYDROXIDE SOURCES

| Example | Aluminum Salt | Composition of Product (Percent by wt.) | | | Form | Yield, g. |
|---|---|---|---|---|---|---|
| | | Al | S | $H_2O$ | | |
| 4 | $Al_2(SO_4)_3 \cdot 18H_2O$ | 4.8 | 6.72 | 6.84 | Friable | 112 |
| 5 | $Al(NO_3)_3 \cdot 9H_2O$ | 7.2 | 6.03 | 5.90 | do | 141 |

Example 1 is adapted to the use of aluminum hydroxide per se and calcium bis-(dioctyl sulfosuccinate) as reactants as follows.

EXAMPLE 6

A solution containing 2.25 moles of dioctyl sulfosuccinic acid is prepared by suspending 992.3 g. of calcium bis-(dioctyl sulfosuccinate) in about 1.5 l. of 1:1 aqueous ethanol and treating the suspension with an equivalent amount of aqueous sulfuric acid. The calcium sulfate is removed by filtration and the filtrate diluted to 2250 ml. with 1:1 aqueous ethanol. An aqueous slurry of 2.25 moles of aluminum hydroxide gel is then fed at an equimolar rate to a mixing vessel simultaneously with the dioctyl sulfosuccinic acid solution prepared above. The contents of the vessel are continuously mixed and maintained at pH 3.2–4.5 by additoin of 1 N aqueous sodium hydroxide solution during the process as required. The product is then recovered as described in Example 1 providing material substantially identical thereto.

The water retained in the present products prepared as described above does not have a significant effect on their utility in preparing pharmaceutical formulations. In practice, samples retaining more than 15% by weight of water are seldom obtained. Samples containing up to 20% by weight water are nevertheless satisfactory for use although somewhat less so for the preparation of tablets than products containing no more than 10.5% of water, the preferred limit. The latter is the preferred upper limit for water content in view of the superior crystal-like nature of the product suiting it for pharmaceutical tableting. Samples assaying 3.5% (Karl Fischer method) water have been obtained by drying at 70° C. in the air.

In view of the somewhat hygroscopic nature of the present products, experiments were conducted to determine the amount of water the substance of Example 1 would absorb when exposed to air having various relative humidities at 25° C. Samples were exposed to atmospheres having relative humidities of 42%, 59%, and 71% for extended periods of time. The sample exposed at 42% relative humidity was found to contain 10.0% water after 5 days and thence to absorb little additional water in a further 4 days. In the same time periods the sample exposed to 59% relative humidity was found to contain 11.9% and 12.6% water respectively which was not further increased after 20 days exposure. Similarly, the sample exposed to 71% relative humidity was found after 5, 9, and 20 days to contain respectively 14.0%, 14.9%, and 15.2% water. Water assays were made by the Karl Fischer method.

EXAMPLE 7

*Syrup Suspension*

A suspension containing 500 mg. of aluminum hydroxide dioctyl sulfosuccinate complex in each teaspoonful (5 ml.) thereof is prepared from the following ingredients. The amounts specified are sufficient to prepare a 1 l. batch of this formulation.

| Ingredient: | Amount |
|---|---|
| Aluminum hydroxide dioctyl sulfosuccinate complex (Example 1) as a fine powder ___g__ | 100.0 |
| Sucrose ___g__ | 200.0 |
| Methyl p-hydroxybenzoate ___g__ | 1.2 |
| Propyl p-hydroxybenzoate ___g__ | 0.3 |
| Guar gum (Burtonite V7E) ___g__ | 6.0 |
| Sorbitol, 70% aqueous (Sorbo, Atlas Powder Co.) ___ml__ | 200.0 |
| Sodium saccharin ___g__ | 1.0 |
| Sodium cyclamate ___g__ | 2.0 |
| Monosodium glutamate ___g__ | 1.0 |
| Ethyl vanillin ___g__ | 1.0 |
| Pineapple flavor (Firmenich 51.351/A) ___ml__ | 0.1 |
| Lemon-lime flavor (Firmenich 51.196/A) ___ml__ | 0.1 |
| F, D, and C yellow No. 5 ___g__ | 0.056 |

Distilled water, 550 ml., is heated to 60° C. and the sucrose, methyl p-hydroxybenzoate, propyl p-hydroxybenzoate, sodium saccharin, sodium cyclamate, sorbitol, and monosodium glutamate are dissolved therein. The mixture is cooled and the guar gum is added. It is further cooled to 35° C. and the pulverized aluminum hydroxide dioctyl sulfosuccinate complex is added. The balance of the ingredients are then added and thoroughly dispersed by passing the composition through a mechanical homogenizer. It is mixed and diluted to 1000 ml. with distilled water.

EXAMPLE 8

Small Compressed Tablet

Conventional tablets are prepared by dry blending finely powdered aluminum hydroxide dioctyl sulfosuccinate complex with a mixture of spray-dried lactose and tableting lubricant in the following proportions.

| Ingredient | G. |
|---|---|
| Aluminum hydroxide dioctyl sulfosuccinate | 50.0 |
| Spray-dried lactose | 145.0 |
| Silicic acid | 3.0 |
| Powdered magnesium stearate | 2.0 |

The blended mixture is then tableted at a weight of 200 mg. The above formulation is the amount required for 1000 tablets.

EXAMPLE 9

Laxative Tablet

The following materials are thoroughly mixed in an appropriate blender.

| Ingredient | Amount, g. |
|---|---|
| Lactose | 79.0 |
| Corn starch | 79.0 |
| Dicalcium phosphate | 79.0 |
| Pregelatinized starch | 27.7 |

A granulation is prepared of this blend of dry ingredients by moistening the mass with distilled water and forcing the paste-like material through a No. 8 stainless steel screen. The resulting granulate is dried in forced air tray dryers. The dried granules are then screened through a No. 16 stainless steel screen to produce a free-flowing material of uniform particle size. The screened granulate is then blended with the following ingredients and the resulting mass is fed to a conventional tableting press and compressed into tablets, each weighing 350 mg.

| Ingredient | Amount, g. |
|---|---|
| Aluminum hydroxide dioctyl sulfosuccinate complex | 50.0 |
| Anthraquinone derivatives from cascara sagrada | 30.0 |
| Magnesium stearate | 1.8 |
| Alginic acid | 3.5 |

The batch size given is sufficient for 1000 tablets.

EXAMPLE 10

Bulking Agent Composition

The following ingredients are employed.

| Ingredient | Amount, g. |
|---|---|
| Aluminum hydroxide dioctyl sulfosuccinate complex (Example 1) | 50.0 |
| Calcium alginate | 375.0 |
| Sodium alginate | 375.0 |
| Silicic acid | 30.0 |
| Stearic acid powder | 5.0 |
| Acacia powder | 95.0 | and thoroughly blended in a suitable apparatus such as These ingredients, except for the stearic acid, are mixed a twin shell blender until a homogeneous mixture is obtained. The stearic acid is then added with just sufficient mixing to distribute it throughout the mass. The mixture is then fed to a tableting press and tablets are prepared each weighing 930 mg. The batch size given is sufficient for 1000 tablets.

EXAMPLE 11

Laxative Bulking Agent Composition

A homogeneous blend of the following ingredients is prepared employing a twin shell blender.

| Ingredient | Amount, g. |
|---|---|
| Aluminum hydroxide dioctyl sulfosuccinate complex (Example 1) | 50.0 |
| Anthraquinone derivatives from cascara sagrada | 30.0 |
| Calcium alginate | 375.0 |
| Sodium alginate | 375.0 |
| Acacia powder | 65.0 |
| Silicic acid | 30.0 |

Stearic acid powder, 5 g., is then added to the blend of the above ingredients and mixed therewith just sufficiently to be distributed throughout the mass. This mixture is then charged to a tableting machine and compressed into tablets weighing 930 mg. each. The batch size described is sufficient for 1000 tablets.

While several particular embodiments of this invention are shown above, it will be understood, of course, that the invention is not to be limited thereto since many modifications may be made, and it is contemplated, therefore, by the appended claims to cover any such modifications as fall within the true spirit and scope of this invention.

We claim:

1. An odorless, relatively tasteless, homogeneous, essentially water insoluble, white friable solid aluminum hydroxide dioctyl sulfosuccinate complex containing from about 1 to about 3 molecular proportions of aluminum hydroxide per molecular proportion of dioctyl sulfosuccinate and on a weight basis from 4.5 to 13.7% aluminum, 4.0 to 7.3% sulfur, and up to 20% water.

2. An odorless, relatively tasteless, homogeneous, white, friable solid aluminum hydroxide dioctyl sulfosuccinate complex containing from about 1 to about 3 molecular proportions of aluminum hydroxide per molecular proportion of dioctyl sulfosuccinate and on a weight basis from 4.5 to 7.8% aluminum, 6.0 to 7.3% sulfur, and up to 10.5% water, said aluminum hydroxide dioctyl sulfosuccinate complex being soluble in ethyl alcohol, U.S.P., chloroform, and benzene, and having very limited solubility in water, propylene glycol, and 1:1 aqueous ethanol.

3. The process which comprises mixing in solution at pH 3.2 to 4.5 from about 1 to about 3 molecular proportions of aluminum hydroxide per molecular proportion of a compound selected from the group consisting of dioctyl sulfosuccinic acid and a salt thereof.

4. The process of claim 3 wherein said compound is sodium dioctyl sulfosuccinate.

5. The process of claim 3 wherein said compound is dioctyl sulfosuccinic acid.

6. The process of claim 3 wherein a solvent mixture containing at least 25% by volume of water is employed as solvent.

7. The process of claim 3 wherein aqueous acetone containing at least 25% by volume water is employed as solvent.

8. The proccess of claim 3 wherein aqueous ethanol containing at least 25% by volume water is used as solvent.

9. The process of claim 3 wherein said aluminum hydroxide is formed in situ by hydrolysis of a water soluble aluminum salt.

10. The process of claim 9 wherein said water soluble aluminum salt is aluminum chloride.

11. The process of claim 9 wherein said water soluble aluminum salt is aluminum sulfate.

12. The process of claim 9 wherein said water soluble aluminum salt is aluminum nitrate.

13. A composition in dosage unit form adapted for oral administration comprising from 10 to 500 mg. of aluminum hydroxide dioctyl sulfosuccinate complex containing from about 1 to about 3 molecular proportions of aluminum hydroxide per molecular proportion of dioctyl sulfosuccinate and on a weight basis from 4.5 to 13.7 percent aluminum, 4.0 to 7.3 percent sulfur, and up to 20 percent water, and a pharmaceutical carrier therefor.

14. The composition of claim 13 containing a therapeutic amount of a laxative.

15. The composition of claim 13 containing a therapeutic amount of a pharmacologically acceptable bulking agent.

16. The composition of claim 13 containing a therapeutic amount of a pharmacologically acceptable bulking agent and a therapeutic amount of a laxative.

References Cited in the file of this patent

UNITED STATES PATENTS

| | | |
|---|---|---|
| 2,880,136 | Gore | Mar. 31, 1959 |
| 2,903,397 | Heilig | Sept. 8, 1959 |

UNITED STATES PATENT OFFICE
CERTIFICATE OF CORRECTION

Patent No. 3,155,577                                                     November 3, 1964

Neil H. Mercer et al.

It is hereby certified that error appears in the above numbered patent requiring correction and that the said Letters Patent should read as corrected below.

Column 7, lines 63 and 64, for "and thoroughly blended in a suitable apparatus such as These ingredients, except for the stearic acid, are mixed" read -- These ingredients, except for the stearic acid, are mixed and thoroughly blended in a suitable apparatus such as --.

Signed and sealed this 6th day of April 1965.

(SEAL)
Attest:

ERNEST W. SWIDER                                   EDWARD J. BRENNER
Attesting Officer                                        Commissioner of Patents